United States Patent [19]

Morinaga et al.

[11] 4,187,642
[45] Feb. 12, 1980

[54] WEATHER-TIGHT SEAL STRUCTURES FOR AUTOMOBILE WINDOWS

[75] Inventors: Teruhiko Morinaga; Ikuo Nishikawa, both of Hiroshima, Japan

[73] Assignee: Toyo Kogyo Co., Ltd., Hiroshima, Japan

[21] Appl. No.: 911,150

[22] Filed: May 31, 1978

[30] Foreign Application Priority Data

May 31, 1977 [JP] Japan ............... 52-70859[U]

[51] Int. Cl.$^2$ ............................................. E05D 15/16
[52] U.S. Cl. ............................. 49/406; 49/413; 49/485; 49/495
[58] Field of Search ............ 49/485, 406, 458, 486, 49/413, 125, 495, 472–474; 160/40

[56] References Cited

U.S. PATENT DOCUMENTS

| | | | |
|---|---|---|---|
| 2,859,493 | 11/1958 | Matschke | 49/413 X |
| 2,938,245 | 5/1960 | Sehn | 49/495 X |
| 3,106,754 | 10/1963 | Grossman | 49/485 X |
| 3,490,176 | 1/1970 | Danois | 49/413 |
| 3,750,338 | 8/1973 | Lissarrague | 49/458 X |
| 3,808,742 | 5/1974 | Ehret et al. | 49/413 |

Primary Examiner—Philip C. Kannan
Attorney, Agent, or Firm—Fleit & Jacobson

[57] ABSTRACT

In a double sliding automobile window, a sealing structure is provided between two sliding window glass panels. The sealing structure includes a sealing strip extending vertically between and secured to the upper and lower run channels and having a pair of sealing lips adapted to engage respectively the window glass panels.

6 Claims, 5 Drawing Figures

WEATHER-TIGHT SEAL STRUCTURES FOR AUTOMOBILE WINDOWS

The present invention relates to weather-tight seal structures for automobile windows and more particularly to weather-tight seal structures for double sliding windows for automobiles.

Conventionally, double sliding windows for automobiles usually comprise two window glasses mounted in window frames for sliding movement. When the window is to be opened, one of the window glasses is slidably moved to a position where it overlaps the other window glass. In closed position, an edge or marginal portion of one window glass overlaps an adjacent marginal portion of the other window glass and a weather-tight seal is provided between the two glasses at the overlapped marginal portions.

Such weather-tight seal is conventionally mounted on one of the window glasses at the vertical edge thereof and has a resilient lip which is adapted to engage the other window glass so as to prevent water from entering the inside the window. In this arrangement, however, gaps are necessarily maintained between the upper and lower ends of the seal and adjacent run channels which are provided in the window frame, in order to allow free movement of the window glass carrying the seal. Therefore, water is often admitted to enter through the gaps into the room. In an effort in overcoming the problem, it may be possible to eliminate the aforementioned gaps between the ends of the seals and the run channels in the window frame, however, such a solution is not recommendable because there will be an increase in the friction between the seal and the run channels.

It is therefore an object of the present invention to provide weather-tight structures for automobile windows which can eliminate any gap between the seal and the run channel.

Another object of the present invention is to provide weather-tight structures for automobile windows which can ensure water-tightness without any increase of frictional force against the movement of the window glass.

According to the present invention, the above and other objects can be accomplished in a window comprising window frame means having upper and lower run channel means, two window glass panels mounted on said frame means for sliding movement between open and closed positions along the run channel means, said glass panels having marginal portions which are overlapped each other in the closed position, by a seal structure which comprises enlongated seal means extending between the upper and lower run channel means and having resilient sealing lip means which extends substantially throughout the length of the seal means and is adapted to slidably and sealingly engage the window glasses. More specifically, the sealing lip means may comprise a pair of sealing lips projecting from the opposite sides of the sealing means. The sealing means may be in the form of a sealing rubber strip and a reinforcement member may be embedded therein. Preferably, the sealing lips are provided at least one those areas which are brought into contact with the window glasses with brush-like configurations so that the friction between the sealing lips and the window glasses can be decreased.

The above and other objects and features of the present invention will become apparent from the following descriptions of a preferred embodiment taking reference to the accompanying drawings, in which.

Figure 1:
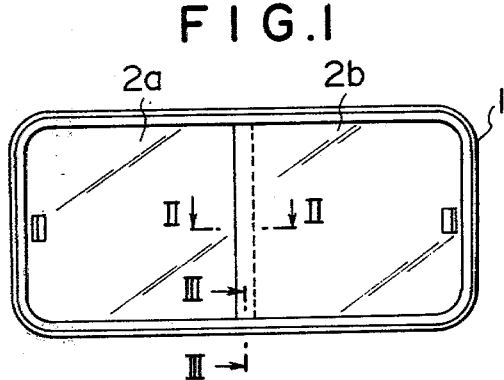
FIG. 1 is a side view of a double sliding window to which the present invention can be applied.

Referring now to the drawings, particularly to FIG. 1, the double sliding window shown therein is comprised of a window frame 1 and a pair of window glasses 2a and 2b mounted on the frame 1. FIG. 1 shows the window glasses 2a and 2b in closed position in which marginal edge portions of the glasses are overlapped with each other.

Figure 2:
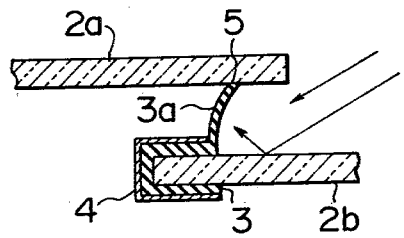
FIG. 2 is a fragmentary sectional view taken substantially along the line II—II in FIG. 1 and showing a typical sealing structure in accordance with a conventional design.
Figure 3:
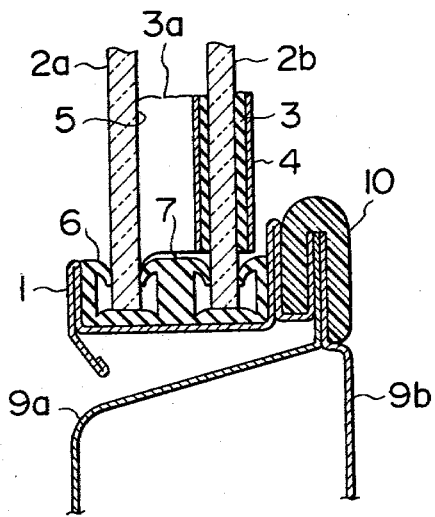
FIG. 3 is a fragmentary sectional view taken substantially along the line III—III in FIG. 1 and showing a sealing structure in accordance with a conventional design.

In order to provide a weather-tight seal between the window glasses 2a and 2b, it has been a conventional practice to provide a sealing strip on one of the window glasses. More specifically, referring to FIG. 2, the window glass 2b carries a sealing strip 3 which is mounted on the marginal edge portion of the glass by means of a channel-shaped seal holding member 4. The sealing strip 3 is formed with a sealing lip 3a which has a sealing edge 5 adapted to be brought into a sealing contact with the window glass 2a.

In this type of arrangement, it is necessary to maintain gaps 7 between the upper and lower ends of the sealing lip 3a and the run channels 6 provided in the window frame 1 in order eliminate frictional force which may otherwise be produced between the lip 3a and the run channels 6 when the window glass 2b is slidably moved. Due to the existence of such gaps, there have been problems of water being admitted to enter the room in the conventional design.

Figure 4:
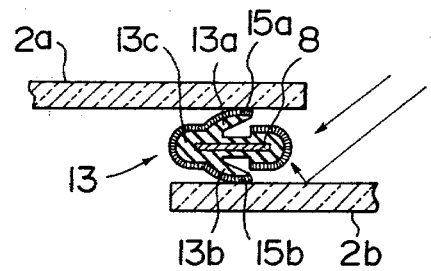
FIG. 4 is a fragmentary sectional view similar to FIG. 2 but showing one embodiment of the present invention; and, FIG. 5 is a fragmentary sectional view similar to FIG. 3 but showing the same embodiment of the present invention as in FIG. 4.
Figure 5:
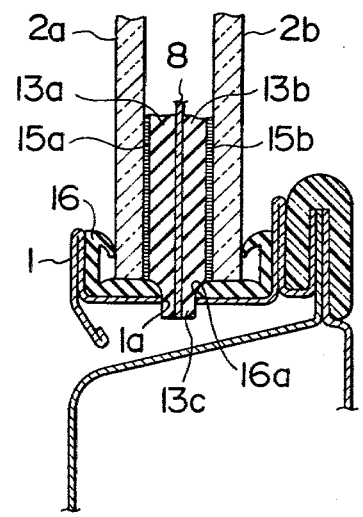

Referring now to FIGS. 4 and 5 showing one embodiment of the present invention, a sealing strip 13 is provided between the overlapped marginal portions of the window glasses 2a and 2b. The sealing strip 13 is comprised of a body 13c which is made of rubber or similar resilient material and has a pair of sealing lips 13a and 13b provided at the opposite sides thereof. A longitudinally extending reinforcement member 8 is embedded in the body 13c. The reinforcement member 8 may be made of steel, a plastic material or any other suitable material.

The sealing strip 13 extends vertically across the window frame 1 and is attached to run channels 16 at the upper and lower ends thereof. As shown in FIG. 5, the window frame 1 is formed with a hole 1a and the run channel 16 with a hole 16a which is aligned with the hole 1a. The lower end of the sealing strip 13 is inserted into the aligned holes 1a and 16a so that the sealing lips 13a and 13b are maintained at their lower ends in contact with the run channel 16. The attachment at the upper end of the sealing strip 13 is similar to that shown in FIG. 5.

The sealing lips 13a and 13b have sealing surfaces 15a and 15b, respectively, which are adapted to be brought into sealing contact with the window glasses 2a and 2b. In order to decrease the friction between the sealing lips 13a and 13b and the window glasses 2a and 2b, the sealing strip 13 is provided with brush-like configurations or brush hairs at the external surface, or at least at the sealing surfaces 15a and 15b.

In the illustrated arrangement, it should be noted that the sealing strip 13 is secured to the window frame and also to the run channels so that no clearance or gap is required between the sealing strip and the run channels. It is therefore possible to block water entering the room through the gap which may otherwise be formed between the sealing strip and the run channels.

The invention has thus been shown and described with reference to a specific arrangement, however, it should be noted that the invention is in no way limited to the details of the illustrated structures but changes and modifications may be made without departing from the scope of the appended claims.

We claim:

1. In a double sliding window structure for a motor vehicle which comprises window frame means having upper and lower run channel means, two window glass panels substantially parallel to each other throughout areas thereof and mounted on said frame means for sliding movement between open and closed positions along the run channel means, said glass panels having marginal portions which are coextensive with remaining portions of the panels and overlapped each other in the closed position, the improvement comprising a weather-tight seal structure including elongated seal means extending between and attached to the upper and lower run channel means, said seal means having resilient sealing lip means which extends substantially throughout the length of the seal means and is always in slidable and sealing engagement with the window glass panels, said sealing lip means having upper and lower ends which are in close contact with the upper and lower run channel means respectively.

2. The seal structure in accordance with claim 1 in which said seal means is attached to the window frame means by being inserted at upper and lower ends into aligned holes provided for the purpose in the frame means and the run channel means.

3. The seal structure in accordance with claim 1 in which said seal means includes reinforcement means embedded therein.

4. The seal structure in accordance with claim 1 in which said sealing lip means comprises a pair of sealing lips projecting from the opposite sides of the sealing means so as to contact said window glass panels, respectively.

5. The seal structure in accordance with claim 4 in which said sealing lips are provided at least on areas which are brought into contact with the window glasses with brush-like configurations so that the friction between the sealing lips and the window glasses can be decreased.

6. The seal structure in accordance with claim 3 in which said seal means is attached to the window frame means by being inserted at upper and lower ends into aligned holes provided for the purpose in the frame means and the run channel means; and in which said seal means includes reinforcement means embedded therein.

* * * * *